US012626310B2

(12) United States Patent
Bhattarai et al.

(10) Patent No.: US 12,626,310 B2
(45) Date of Patent: May 12, 2026

(54) ENHANCING DISTRIBUTION SYSTEM RESILIENCY USING TRANSACTIVE MECHANISMS

(71) Applicant: Battelle Memorial Institute, Richland, WA (US)

(72) Inventors: Bishnu P. Bhattarai, Kennewick, WA (US); Jing Xie, Bellevue, WA (US); Kevin P. Schneider, Seattle, WA (US); Wei Du, Richland, WA (US); Laurentiu D. Marinovici, Kirkland, WA (US)

(73) Assignee: BATTELLE MEMORIAL INSTITUTE, Richland, WA (US)

( * ) Notice: Subject to any disclaimer, the term of this patent is extended or adjusted under 35 U.S.C. 154(b) by 0 days.

(21) Appl. No.: 17/478,696

(22) Filed: Sep. 17, 2021

(65) Prior Publication Data

US 2022/0084139 A1 Mar. 17, 2022

Related U.S. Application Data

(60) Provisional application No. 63/079,525, filed on Sep. 17, 2020.

(51) Int. Cl.
*G06Q 50/06* (2024.01)
*H02J 13/00* (2006.01)

(52) U.S. Cl.
CPC ........ *G06Q 50/06* (2013.01); *H02J 13/00001* (2020.01)

(58) Field of Classification Search
CPC .. G06Q 50/06; H02J 13/00001; H02J 3/0075; H02J 2203/10; Y04S 10/40
USPC ........................................................ 700/291
See application file for complete search history.

(56) References Cited

U.S. PATENT DOCUMENTS

| | | | |
|---|---|---|---|
| 6,119,052 A | 9/2000 | Guenther et al. | |
| 9,425,620 B2 | 8/2016 | Chassin et al. | |
| 9,557,720 B1 | 1/2017 | Woods et al. | |
| 9,762,060 B2 | 9/2017 | Kalsi et al. | |
| 10,416,206 B2 | 9/2019 | Williams et al. | |
| 10,498,141 B2 | 12/2019 | Kalsi et al. | |
| 10,725,075 B2 | 7/2020 | Williams et al. | |
| 10,740,775 B2 | 8/2020 | Hammerstrom et al. | |

(Continued)

OTHER PUBLICATIONS

Alam et al., "Transactive Approach for Engaging Distribution Network Assets for Voltage Management in Southern California Edison Distribution Feeders," Pacific Northwest National Laboratory (PNNL), Richland, WA, Tech. Rep. (PNNL 2018).

Bhattarai et al., "Enhancing Distribution System Resiliency Through a Novel Transactive Energy Systems Framework," in *2019 IEEE Power & Energy Society General Meeting (PESGM)* (IEEE 2019), pp. 1-5.

Bhattarai et al., "Flexible Bidding of Electric Energy Storage for Retail Day-Ahead Transactive Market," in *2020 IEEE/PES Transmission and Distribution Conference and Exposition (T&D)* (IEEE 2020), pp. 1-5.

(Continued)

*Primary Examiner* — Mohammad Ali
*Assistant Examiner* — Saad M Kabir
(74) *Attorney, Agent, or Firm* — Klarquist Sparkman, LLP

(57) ABSTRACT

Computing apparatus and methods to increase operational flexibility in an energy distribution system include using a transactive mechanism to adjust voltage supplied to a power grid by one or more distributed energy resources (DERs). In some examples of the disclosed technology, the transactive mechanism is configured to cause the one or more DERs to adjust a corresponding supply of voltage to the power grid in order to reach a targeted voltage difference across terminals of a switching device of the power grid, thereby enabling the switching device to be switched to increase reliability of the power grid.

23 Claims, 7 Drawing Sheets

(56)　　　References Cited

U.S. PATENT DOCUMENTS

| | | | |
|---|---|---|---|
| 10,784,686 | B2 | 9/2020 | Schneider et al. |
| 11,159,044 | B2 | 10/2021 | Lian et al. |
| 11,361,392 | B2 | 6/2022 | Bhattarai et al. |
| 11,451,061 | B2 | 9/2022 | Radhakrishnan et al. |
| 11,468,460 | B2 | 10/2022 | Hammerstrom et al. |
| 11,515,704 | B2 | 11/2022 | Du et al. |
| 2006/0116794 | A1 | 6/2006 | Stoupis et al. |
| 2011/0231028 | A1 | 9/2011 | Ozog et al. |
| 2012/0029897 | A1 | 2/2012 | Cherian et al. |
| 2012/0144828 | A1 | 6/2012 | Lazaris |
| 2012/0249286 | A1 | 10/2012 | Bush et al. |
| 2012/0278220 | A1 | 11/2012 | Chassin et al. |
| 2012/0278221 | A1 | 11/2012 | Fuller et al. |
| 2013/0024043 | A1 | 1/2013 | Shaffer et al. |
| 2013/0218743 | A1 | 8/2013 | Chassin et al. |
| 2013/0218744 | A1 | 8/2013 | Chassin et al. |
| 2014/0018969 | A1 | 1/2014 | Forbes et al. |
| 2014/0233620 | A1 | 8/2014 | Bernheim et al. |
| 2014/0379157 | A1 | 12/2014 | Das et al. |
| 2015/0094968 | A1* | 4/2015 | Jia ........................... G05B 15/02 |
| | | | 702/60 |
| 2016/0077507 | A1 | 3/2016 | Sheble et al. |
| 2016/0190805 | A1* | 6/2016 | Steven .................... G06Q 50/06 |
| | | | 700/291 |
| 2018/0366978 | A1 | 12/2018 | Matan et al. |
| 2019/0148941 | A1* | 5/2019 | Wang ........................ H02J 3/38 |
| | | | 700/287 |
| 2019/0163150 | A1 | 5/2019 | Wong et al. |
| 2019/0172159 | A1 | 6/2019 | Sun et al. |
| 2020/0006944 | A1 | 1/2020 | Fife et al. |
| 2020/0203951 | A1 | 6/2020 | Alam et al. |
| 2022/0084139 | A1 | 3/2022 | Bhattarai et al. |

OTHER PUBLICATIONS

Bhattarai et al., "Transactive Electric Water Heater Agent: Design and Performance Evaluation," in *2020 IEEE Power & Energy Society Innovative Smart Grid Technologies Conference (ISGT)* (IEEE 2020), pp. 1-5.

Bhattarai et al., "Transactive Energy Systems for Contingencies," Panel Presentation, *IEEE PES Transactive Energy System Conference*, (I2019).

Chassin et al., "GridLAB-D: An Open-Source Power Systems Modeling and Simulation Environment," in *2008 IEEE/PES Transmission and Distribution Conference and Exposition* (IEEE 2008), pp. 1-5.

Kritprajun et al., "Volttron™ Agent Development for Enabling Reactive Power Support of Non-Utility DERs by Integrating Transactive Energy Approach," also published as *2020 IEEE Power & Energy Society General Meeting (PESGM)* (Montreal, Canada, 2020), pp. 1-5.

Lian et al., "Transactive System: Part II: Analysis of Two Pilot Transactive Systems Using Foundational Theory and Metrics," Pacific Northwest National Laboratory (PNNL), Richland, WA, Tech. Rep. (PNNL 2018).

Melton, "Pacific Northwest Smart Grid Demonstration Project Technology Performance Report vol. 1: Technology Performance," Pacific Northwest National Laboratory (PNNL), Richland, WA, Tech. Rep. (PNNL 2015).

Tucker et al., "Increasing Grid Resilience with Transactive Energy," document dated May 27, 2021, available at: https://sepapower.org/knowledge/increasing-grid-resilience-with-transactive-energy/.

\* cited by examiner

Figure 4:
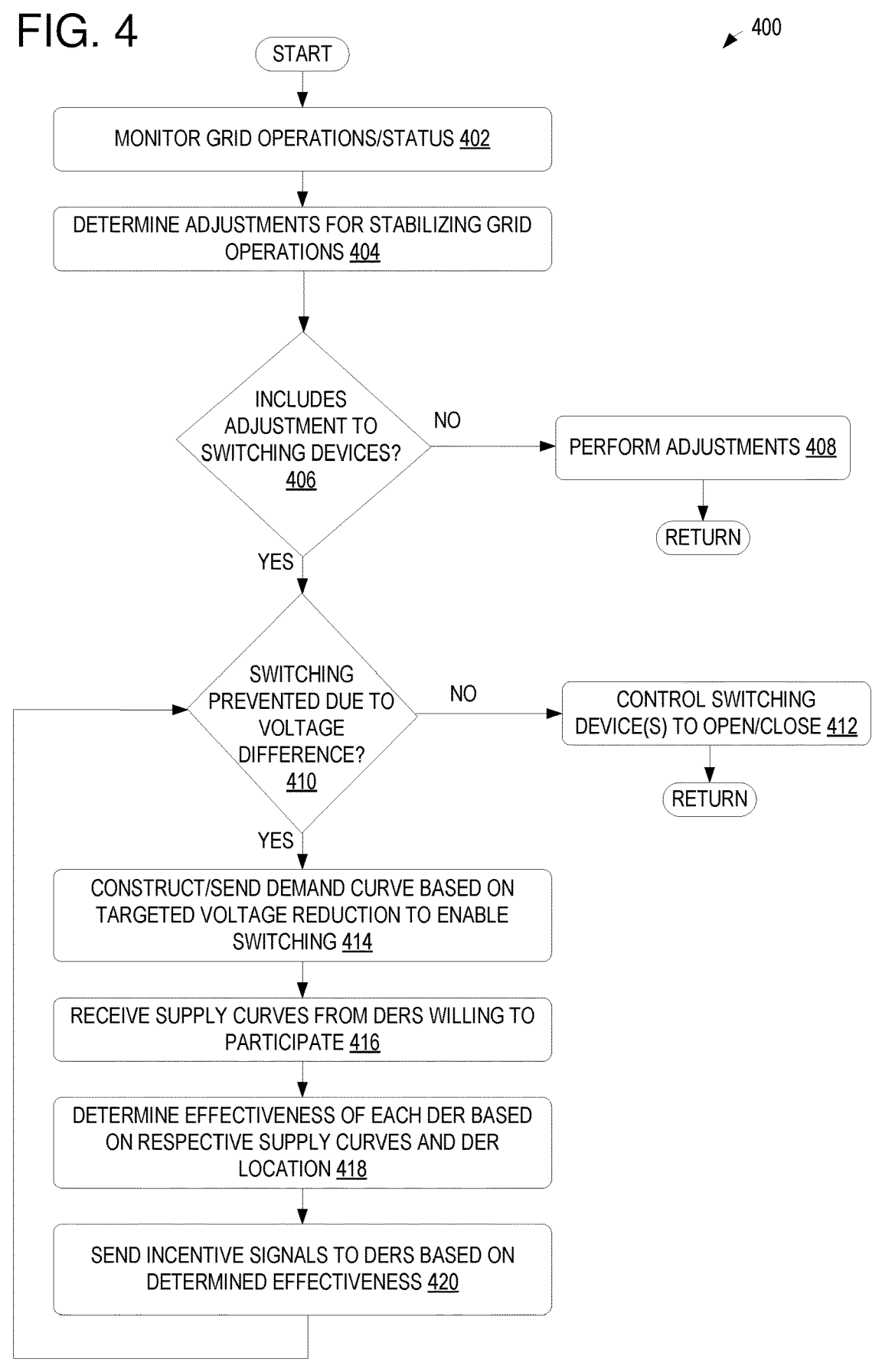

START

MONITOR GRID OPERATIONS/STATUS 402

DETERMINE ADJUSTMENTS FOR STABILIZING GRID OPERATIONS 404

INCLUDES ADJUSTMENT TO SWITCHING DEVICES? 406 — NO → PERFORM ADJUSTMENTS 408

RETURN

YES

SWITCHING PREVENTED DUE TO VOLTAGE DIFFERENCE? 410 — NO → CONTROL SWITCHING DEVICE(S) TO OPEN/CLOSE 412

RETURN

YES

CONSTRUCT/SEND DEMAND CURVE BASED ON TARGETED VOLTAGE REDUCTION TO ENABLE SWITCHING 414

RECEIVE SUPPLY CURVES FROM DERS WILLING TO PARTICIPATE 416

DETERMINE EFFECTIVENESS OF EACH DER BASED ON RESPECTIVE SUPPLY CURVES AND DER LOCATION 418

SEND INCENTIVE SIGNALS TO DERS BASED ON DETERMINED EFFECTIVENESS 420

FIG. 5

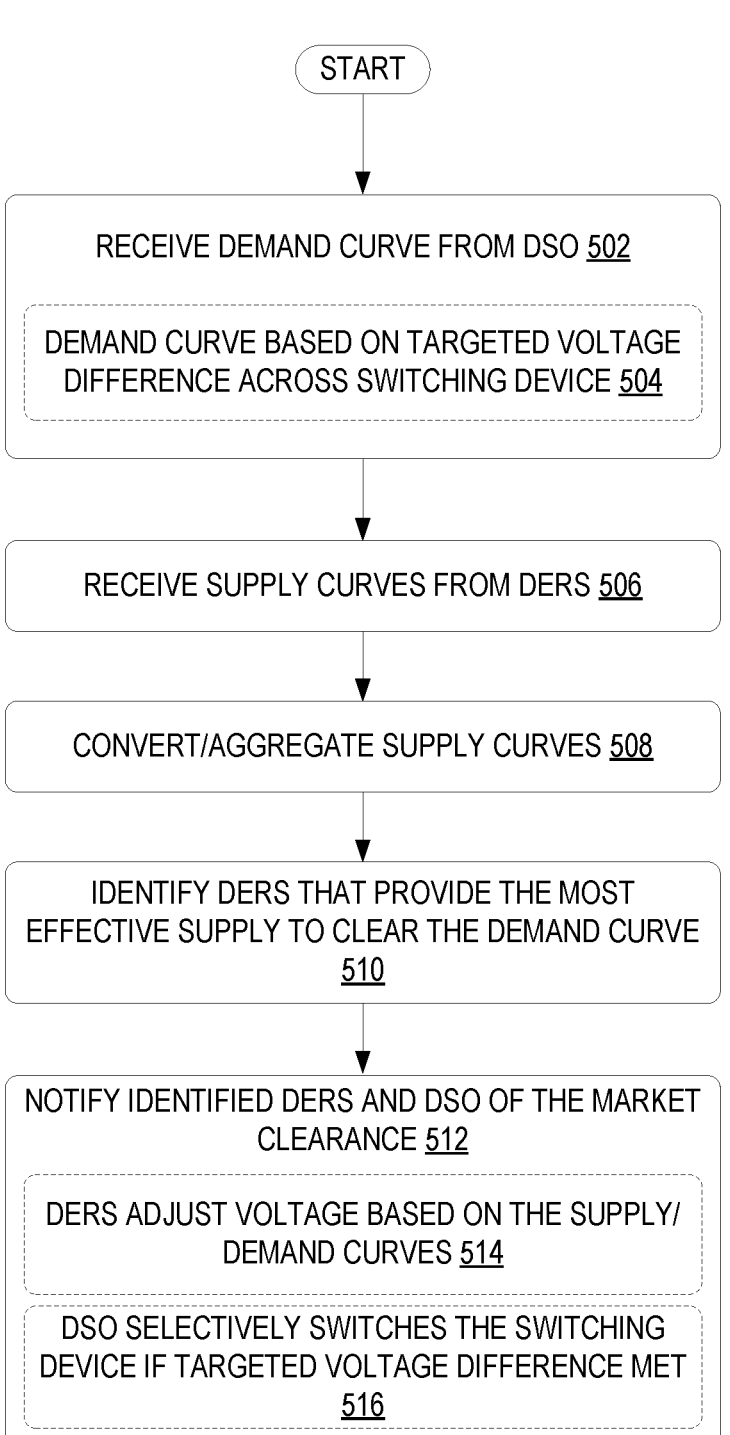

500

START

RECEIVE DEMAND CURVE FROM DSO 502

DEMAND CURVE BASED ON TARGETED VOLTAGE
DIFFERENCE ACROSS SWITCHING DEVICE 504

RECEIVE SUPPLY CURVES FROM DERS 506

CONVERT/AGGREGATE SUPPLY CURVES 508

IDENTIFY DERS THAT PROVIDE THE MOST
EFFECTIVE SUPPLY TO CLEAR THE DEMAND CURVE
510

NOTIFY IDENTIFIED DERS AND DSO OF THE MARKET
CLEARANCE 512

DERS ADJUST VOLTAGE BASED ON THE SUPPLY/
DEMAND CURVES 514

DSO SELECTIVELY SWITCHES THE SWITCHING
DEVICE IF TARGETED VOLTAGE DIFFERENCE MET
516

ENHANCING DISTRIBUTION SYSTEM RESILIENCY USING TRANSACTIVE MECHANISMS

CROSS-REFERENCE TO RELATED APPLICATIONS

This application claims the benefit of U.S. Provisional Patent Application No. 63/079,525, filed Sep. 17, 2020, which application is incorporated herein by reference in its entirety.

ACKNOWLEDGMENT OF GOVERNMENT SUPPORT

This invention was made with Government support under Contract DE-AC0576RL01830 awarded by the U.S. Department of Energy. The Government has certain rights in the invention.

FIELD

The field is electrical power distribution systems.

BACKGROUND

Reconfiguring power distribution after an outage may be performed to restore service to the maximum number of end-use customers. However, the ability to reconfigure the system can be constrained due to voltage and rating limits on equipment. Thus, there remains ample opportunity for methods and devices to provide such reconfigurations in consideration of equipment ratings without the attendant drawbacks.

SUMMARY

According to an aspect of the disclosed technology, methods include performing a transactive mechanism with one or more distributed energy resources (DERs) for a power grid, wherein the transactive mechanism is configured to cause the one or more DERs to adjust a corresponding supply of voltage to the power grid in order to reach a targeted voltage difference across terminals of a switching device of the power grid, and, in response to determining that the targeted voltage difference across the terminals of the switching device is reached, switching the switching device to stabilize the power grid.

According to another aspect of the disclosed technology, a distribution management systems (DMS) for a power grid include memory for storing executable instructions and one or more processors that execute the instructions to monitor the power grid and determine a switching operation for a switching device in the power grid to increase a stability of the power grid. The instructions may also be executable to determine an adjustment to a voltage difference across terminals of the switching device to enable performance of the switching operation, and output, to a market computing system, a demand curve based on the adjustment to the voltage. The instructions may further be executable to receive, via the market system, an indication of market-cleared supply curves from one or more distributed energy resources (DERs) of the power grid, determine that respective voltage supplies from the one or more DERs provide the adjustment to the voltage difference across the terminals of the switching device, and perform the switching operation on the switching device.

According to another aspect of the disclosed technology, methods include receiving a demand curve, wherein the demand curve is based on a targeted voltage adjustment for a voltage difference across terminals of a switching device of the power grid determined by a distribution management system (DMS) to enable performance of a switching operation on the switching device for stabilizing the power grid, and receiving supply curves from one or more distributed energy resources (DERs) for supplying voltage to the power grid. The methods further include determining an effectiveness of each of the one or more DERs based on the respective supply curves and a respective location of the one or more DERs, and transmitting incentive signals to a subset of the one or more DERs based on the determined effectiveness to request that the DERs adjust a respective voltage supplied to the power grid to reach the targeted voltage adjustment across the terminals of the switching device, wherein the switching operation is performed responsive to reaching the targeted voltage adjustment across the terminals of the switching device.

The foregoing and other objects, features, and advantages of the disclosed technology will become more apparent from the following detailed description, which proceeds with reference to the accompanying figures.

BRIEF DESCRIPTION OF THE DRAWINGS

FIG. 1 is a block diagram of an electrical power distribution system including a market operation device, as can be implemented in certain examples of the disclosed technology.

FIG. 4 is a flow chart of an example method for a distribution system operator performing a transactive mechanism in a power grid.

FIG. 5 is a flow chart of an example method for a market operation system managing a transactive mechanism in a power grid.

DETAILED DESCRIPTION

I. Introduction to the Disclosed Technology

Figure 2:
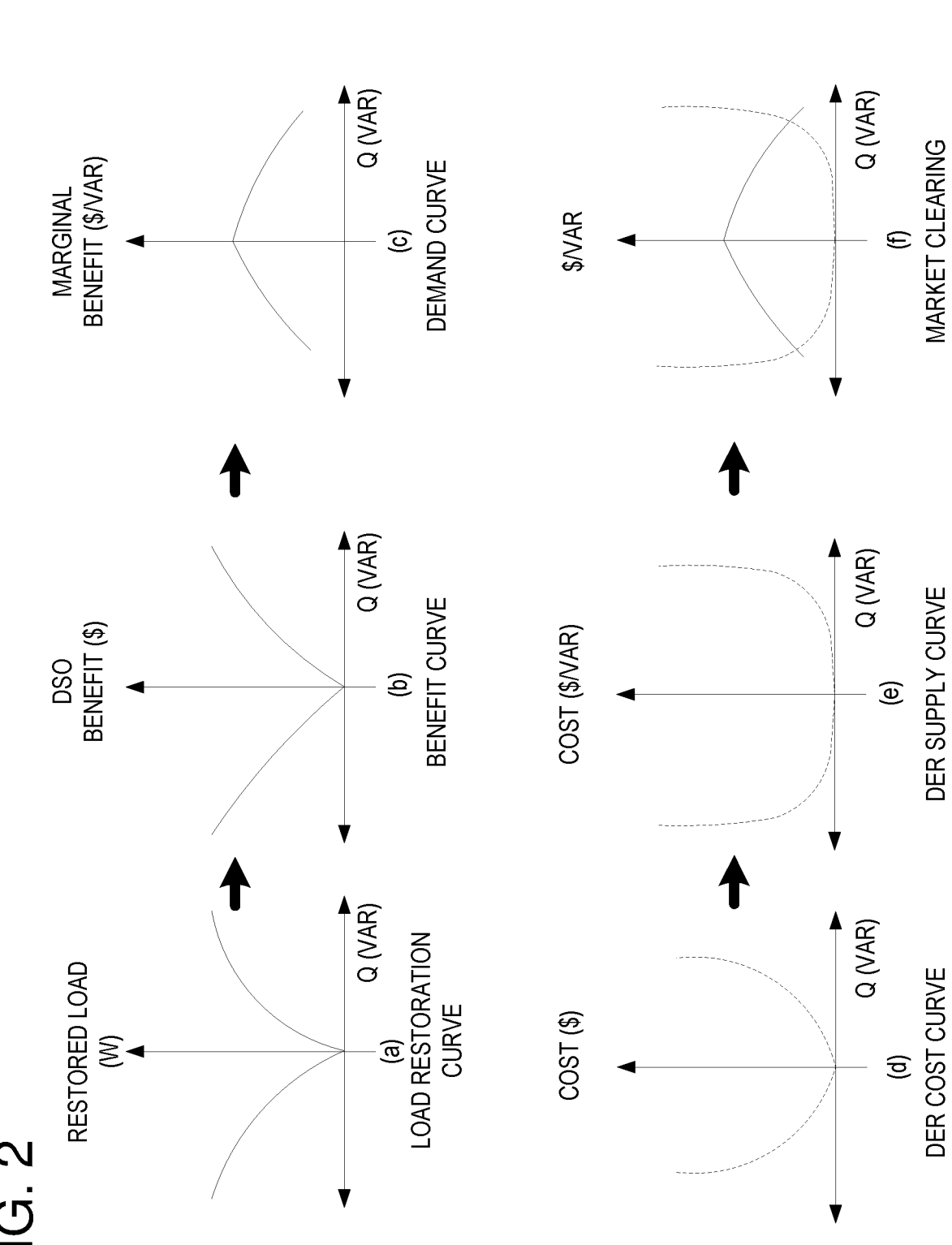
FIG. 2 shows example supply and demand curves used for a first example transactive energy algorithm implemented according to the disclosed technology.

The increasing frequency of extreme power outage events in recent years is threatening the resiliency of the existing electric grid. The majority of distribution systems in North America are more vulnerable to outage events than transmission systems because distribution systems are operated radially and have significantly more circuit miles than transmission systems. A substantial operating constraint for electric utilities is that they often do not have enough resources to fully restore the end-use loads during a loss of the bulk power system. In addition, when attempting to restore end-use loads with local microgrid assets, restoration may be delayed or infeasible because of local grid constraints (e.g., voltage and thermal constraints). For instance, even though there may be enough resources available in the distribution system to restore all loads in a given segment, the utility may not be able to perform switching operations to energize that segment due to a large voltage differential across recloser(s) and/or thermal overloading of some equipment. These local grid constraints prevent or limit the number of switching operations that utilities can perform during the loss of bulk power system to restore the end-use loads.

The increased deployment of utility-owned and customer-owned distributed energy resources (DERs), which can be aggregated in one or more microgrids, into distribution systems provides a number of operational opportunities that would be beneficial during a loss of the bulk power system. However, existing distribution system control and operational schemes have limited mechanisms to engage customer-owned resources, especially during extreme bulk power system outage events, hereafter called resiliency events. The lack of proper incentive mechanisms and supporting architecture and infrastructure are a few limiting factors to engage the non-utility resources during the resiliency events. Engaging and incentivizing DERs during outages to increase operational flexibility is still a challenge for the distribution system operators (DSOs).

Prior studies have used various techniques including network reconfiguration and microgrids and DERs as resiliency resources during bulk power outage events. Some approaches evaluate the feasibility of using microgrids as a resiliency resource during extreme conditions. To further improve resiliency of the distribution grids, microgrids can be networked to support critical end-use loads. However, these approaches assumed that DSOs or microgrid operators could control and operate the DERs available in the system, which is not always true in the case of a mixed ownership model. In North America, DSOs typically do not have direct control of non-utility DERs, with the exception of a limited number of direct load control (DLC) programs. Additionally, the operational flexibility of DLC programs can be limited if there are a small number of participants and/or if their contracts provide a small range of responsiveness. One option for controlling distributed resources that is described in this disclosure is to provide an incentive signal that indicates what would be most beneficial for the system and how participation would benefit the DER owners.

II. Example Transactive Operational Framework

A transactive energy system (TES) provides a mechanism to generate incentive signals to engage non-utility DERs for various grid services. Several TES approaches have demonstrated the use of transactive signals to engage DERs. Pacific Northwest National Laboratory (PNNL) led development of a TES architecture and valuation framework to engage DERs for multiple grid services and demonstrated improved participation of nonutility DERs through a number of pilot projects. However, these studies were designed primarily for economic operation and were not directly applied to distribution system operations. Because operation for resiliency events requires consideration of constraints on local distribution system restoration operations, existing transactive approaches designed for economic operations cannot be applied directly.

In addition to the marginal benefit and marginal cost that is used during normal economic operations, the transactive approach for resiliency applications should reflect the technical needs of DSOs within its bid-curve. The majority of existing literature on TESs focuses on economic operations and/or peak load reductions, with limited research focusing on transactive approaches for resiliency applications.

This disclosure presents, among other examples, two transactive approaches that can be deployed to improve distribution system resiliency by increasing the number of available switching operations and increase load restoration. The first transactive energy approach (TEA-1) can be applied to energize additional line segments during system reconfiguration and service restoration. The second approach (TEA-2) can be applied to reduce the voltage differential across a recloser to enable additional switching operations where a higher voltage differential prevents them from being performed. Therefore, utilities may use TEA-1 or TEA-2 depending on the specific operational need. TEA-1 is expanded to engage inverter-based DERs during resiliency events to increase load restoration by incentivizing the reactive power input/output of non-utility DERs. TEA-2 incorporates a network voltage sensitivity in the market process to account for the locational benefits of DERs. The disclosure also presents a framework to demonstrate how these transactive approaches can be deployed into the utility decision-making system such as within a distribution management system (DMS).

Some features of the approaches to be described herein include:

1) A transactive operational system framework and a process to engage non-utility owned DERs during a bulk-power system outage as a tool to improve distribution system resiliency;

2) Computers executing transactive algorithms that can capture the locational benefits of DERs by taking network voltage sensitivity into account;

3) A representative utility operation system by integrating transactive approaches as an added DMS functionality using a HELICS-based federated co-simulation; and 4) An at-scale demonstration of computers using the transactive algorithms in a realistic utility operating system by co-simulating the electric distribution system, a representative utility control-center, and the communication network supporting the system and/or operations.

The transactive approaches may be deployed as an added DMS functionality to engage and provide an incentive to non-utility owned DERs during resiliency events.

Using disclosed transactive algorithms, disclosed computing systems develop transactive signals to engage non-utility DERs such that local grid constraints are alleviated, enabling more switching options to support switching operations. In some examples, the system focuses on engaging non-utility solar photovoltaic (PV) systems to transact reactive power for supporting additional switching operations to the utility. In some examples, the framework is general enough to be applied to any suitable inverter-interfaced DER type. The following assumptions are made for this discussion:

1) The electric utility may not have direct visibility of the non-utility DERs and may not be able to directly control them.

2) Electric utilities first use utility-owned resources in response to resiliency events and call for transactive only if they could not restore the desired level of load.

3) One or more computers executing disclosed transactive algorithm(s) are called by the DMS with a targeted performance improvement, for example, reducing the voltage across the normally open recloser to an acceptable level for closing.

4) When called, the computers collects the bid information (from DERs and the DSO) and computes the incentive signals to engage non-utility resources according to disclosed transactive algorithm(s).

Figure 1:
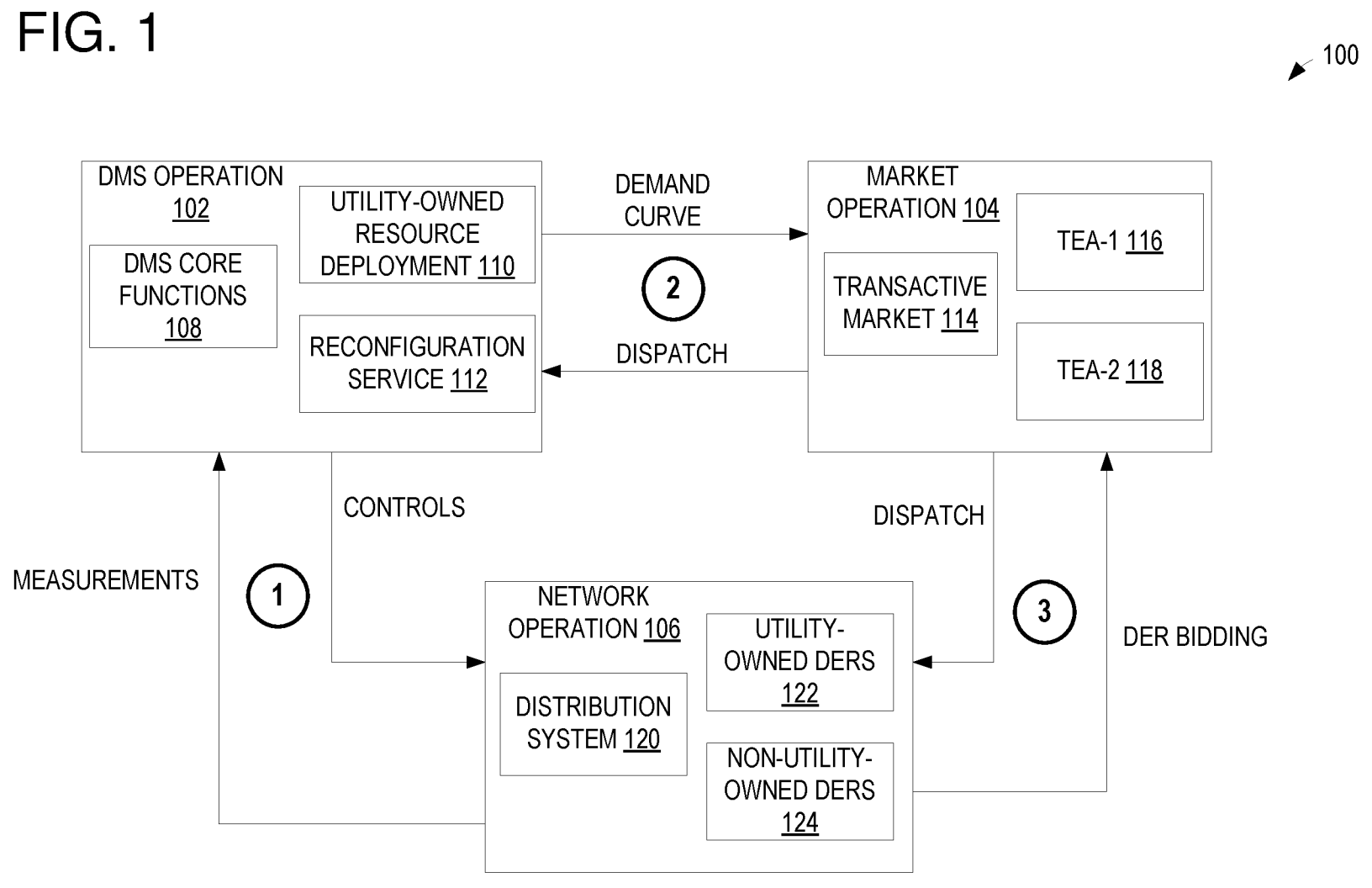

An example transactive system 100 illustrating the operational deployment of transactive approaches with the utility DMS 102 is shown in FIG. 1. The encircled numbers (1-3) in FIG. 1 represent the sequence of operations in terms of executing the transactive approach during grid outage conditions. When there is an outage (e.g., detected by the measurements sent between the DMS 102 and the network 106), the resiliency plan starts with the self-healing system (e.g., reconfiguration service 112 and/or DMS core functions 108) in the DMS 102 computing the optimal reconfiguration plan considering utility-owned resources controlled by utility-owned resource deployment 110. If the utility is able to restore the entire load with their own resources (e.g., utility-owned DERs 122), only the actions defined through interface '1' (as shown in FIG. 1) are performed. The DMS makes the optimal reconfiguration decision using the monitored status of network reclosers and utility-owned DERs 122. The optimal decisions are executed by the DMS using its own infrastructure.

However, if utility-owned resources are not sufficient to restore the loads, the DMS activates the transactive algorithm to engage non-utility DERs via a computer implementing a market operation 104 (such activation is shown by interface '2' in FIG. 1). Example approaches to implementing suitable transactive algorithms are shown at TEA-1 116 and TEA-2 118, which will be described in more detail below. The DSO expresses its requirement in the form of its demand curve. Then, the transactive system 100 implements a distribution level transactive market 114 to calculate incentive signals to engage non-utility DERs in the network 106 to meet the DSO demand (such engagement is shown by interface '3' in FIG. 1). The DSO may express its demand in the form of marginal benefits from the participation of non-utility DERs 124 or simply in terms of the technical requirements (e.g., demand to improve voltage by x % at the weakest node in the network). Similarly, non-utility DERs 124 communicate willingness to participate in the market by submitting their respective marginal cost(s). After computing the market, the system dispatches the incentive signals to all market participants to enable additional switching options to the DMS for restoring additional loads. Finally, the DMS executes the additional switching options that were feasible due to contributions from the non-utility DERs 124.

III. Examples of Applying Transactive Algorithms in a Transactive Operational System As discussed above, different transactive algorithms may be employed (e.g., called by the DSO independently) to incentivize and engage non-utility DERs. Two example algorithms (TEA-1 and TEA-2) are described in detail herein, however, it is to be understood that additional or alternative algorithms utilizing the transactive mechanisms described herein may be applied in other example implementations of the disclosure. While both of the approaches (TEA-1 and TEA-2) engage inverter-based non-utility DERs to increase load restoration by incentivising the reactive power input/output of non-utility DERs, their design, and the application, of these algorithms is different. The following sections detail the transactive process to engage non-utility DERs during resiliency events.

A. Transactive Energy Algorithm-1 (TEA-1)

An example of computing system implementing TEA-1 is shown in FIG. 2 by way of example graphs 200. The following subsections detail the key components and the overall transactive mechanism for TEA-1, including supply curve generation, demand curve generation, and the market resolution process.

1) Supply Curve Generation: The supply curve reflects the marginal cost of providing reactive power to the supplier. Therefore, each participating DER prepares its supply curve by reflecting its cost of providing reactive power. The cost may include a combination of 1) loss of revenue (LoR) due to active power curtailment required to provide the reactive power, 2) increased losses in the system to provide reactive power, and/or 3) wear-and-tear cost of the system to provide the additional reactive power. Because the LoR depends heavily on the DER operating points, the supply curve also is greatly influenced by the loading level of the DERs. For example, if the DER is operating at no load, the cost of providing reactive power is very small because there is no need to curtail active power. However, the cost of providing reactive power can be significant if the DER is operating at full load because a DER cannot provide reactive power without curtailing its active power. The costs of providing reactive power can be computed using Equation 1.

$$C^Q_{Curt} = \tag{1}$$

$$C_{RT} \times \left( \sqrt{S^2_{Inv} - Q^2_{Inv}} - P_{Inv} \right) - C_{RT} \times \left( \sqrt{S^2_{Inv} - (Q_{Inv} + Q_{OFR})^2} - P_{Inv} \right)$$

where, $$C^Q_{Curt}$$

is the cost to DERs for providing reactive power, $C_{RT}$ is the retail price of electricity, $S_{Inv}$ is the rated apparent power of the inverter, $P_{Inv}$ and $Q_{Inv}$ are the current operating points of the inverter, and $Q_{OFR}$ is the offered reactive power from DER. Differentiating the reactive power cost in (1) with respect $Q_{OFR}$ yields the marginal cost of providing reactive power; that is, the supply curve of the DER.

2) Demand Curve Generation: During resilience actions, the DSO can use the DERs' flexibility in order to make decisions on how to restore the loads and enable additional switching options. Therefore, the DSO calculates a demand curve to reflect the marginal benefit it would get as a function of reactive power from the DERs. First, the DSO expresses the additional loads that can be restored as a function of reactive power from DERs, hereafter called the load restoration curve (LRC). The LRC is computed iteratively by increasing the reactive power contribution from DERs in small steps and calculating the corresponding additional load that can be restored. Utilities may include the targeted resiliency metrics to convert the LRC into the monetary benefit to the DSO. The metrics are chosen to properly value the additional restored load. In this example, the LRC is converted into a benefit curve by using 1) LoR to DSO due to not being able to serve the loads, 2) energy not served (ENS) cost to DSO, and 3) demand not served (DNS) cost to DSO. In other examples, the LRC can be converted to a benefit curve using only one or two of these parameters. In this example, LoR is used based on the assumption that the DSO makes some profit from the difference between the wholesale electricity price where it purchases energy and the retail electricity price where it sells the electricity. Similarly, ENS and DNS are used based on the assumption that the DSO may need to pay penalties for not serving loads to certain critical customers. The DSO benefit curve is calculated using Equation 2:

$$B_{DSO}=[(C_{WL}-C_{RT})*\Delta T+C_{ENS}*\Delta T+C_{DNS}]*\Delta P_L \qquad (2)$$

where $B_{DSO}$ is the benefit to the DSO (in dollars, $), $\Delta_{PL}$ is the additional restored load (kW), $\Delta_T$ is the outage duration (h), $C_{WL}$ is the wholesale electricity price ($/kWh), $C_{RT}$ is the retail price of electricity ($/kWh), $C_{ENS}$ is the ENS cost ($/kWh) to DSO, and $C_{DNS}$ is the DNS cost ($/kW) to the DSO. The demand curve for the DSO then is computed from the DSO benefit curve by taking the first-order differentiation of the benefit curve with respect to the reactive power quantity offered by the DERs. While in this example the benefit is expressed in dollars for ease of explanation, as will readily be understood by a person of ordinary skill in the art having the benefit of the present disclosure, other metrics of benefit can be used in other examples.

3) Market Resolution Process: The market collects supply curves from all participating customers and demand curves from the DSO. First, all supply curves from the participating customers are aggregated. A double auction market strategy (for example, as shown in FIG. 2(f)) is used to clear the demand curve from the DSO and the aggregated supply curves from participating DERs. In this example, the intersection between the aggregated supply curve and demand curve maximizes social welfare and gives market clearing. In this example, the market-clearing process provides the cleared quantity and prices.

While the DSO uses the cleared price and quantity, the overall load that can be restored as a result of the transactive engagement of the DERs is often more significant. Therefore, the cleared reactive power may be mapped onto the LRC to compute additional load that can be restored. After computing the additional load that can be restored for the cleared reactive power, the system checks whether or not additional switching is possible for the predefined switching sequence. Moreover, in some implementations, the switch for a given distribution segment can only be closed if the load that can be restored from reactive power is greater than the total load of that segment.

B. Transactive Energy Algorithm-2 (TEA-2)

Figure 3:
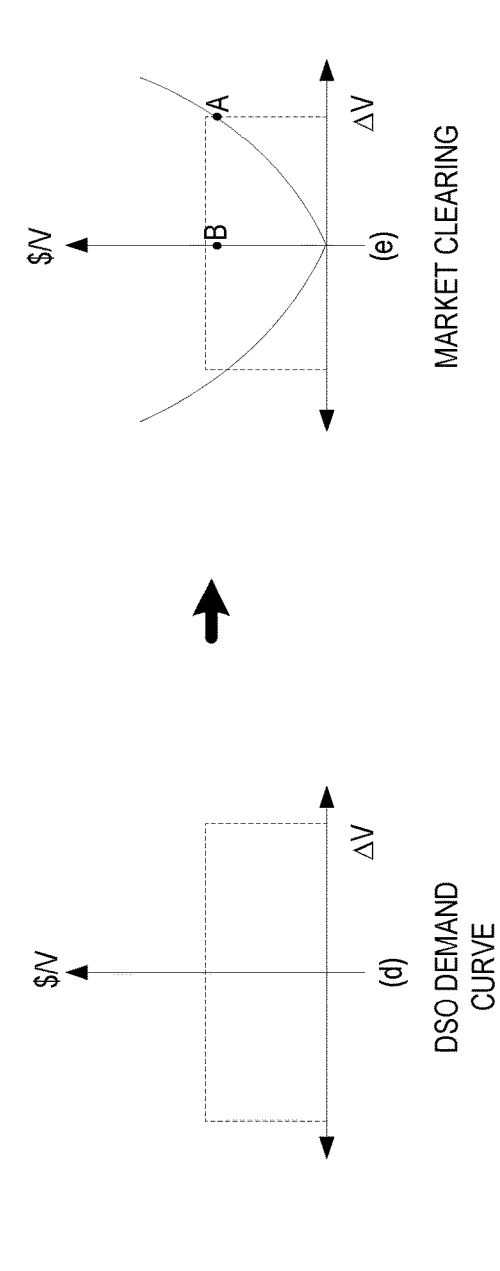
FIG. 3 shows example supply and demand curves used for a second example transactive energy algorithm implemented according to the disclosed technology.

FIG. 3 shows an example of computing system implementing TEA-2 in the form of graphs 300. As described above, TEA-2 incorporates network voltage sensitivity in the market process to provide voltage support to targeted weak points in distribution systems as well as to capture the locational value of spatially distributed DERs. For instance, utilities can use TEA-2 to close their "normally open" switches during service restoration that they would not be able to do so due to larger voltage differences across the terminals. TEA-2 provides a transactive mechanism to engage DERs to reduce the voltage difference across those switching devices and enables the utilities to achieve more switching operations, and hence restores additional network segments and loads. One aspect of TEA-2 is the incorporation of the network voltage sensitivity into the transactive process to capture the locational value of spatially distributed DERs. For instance, a DER located closer to the weak point in the network may have more impact than a DER located farther from the weak point for supporting voltage.

1) DER Supply Curve: The DER supply curve indicates the marginal cost of injecting and absorbing reactive power to the system. The process of constructing the supply curve is the same as the process described in TEA-1, except for one difference where the supply curve generated by the participating DERs are modified to integrate network voltage sensitivity. Because TEA-2 is applied to reduce the voltage difference across a switch, the DER supply curve expresses how much voltage support is available at the given node. However, a DER connected to a node usually does not have the system-level information; therefore, the DER does not integrate voltage sensitivity into their bid curve. Moreover, bus voltages can change with respect to the network topology and other operational conditions. Therefore, the DERs do not produce their respective supply curves by incorporating the network voltage sensitivity. Consequently, DERs submit their marginal supply curves ($/kVAR vs. kVAR), and the DSO converts the marginal supply curves into ($ vs. V) using the voltage sensitivity at the node to which these DERs are connected. Details of an example of this calculation are shown in Equation 3:

$$C_{Inv}^Q = C_{RT} \times \left( \sqrt{S_{Inv}^2 - Q_{Inv}^2} - \sqrt{S_{Inv}^2 - (Q_{Inv} + Q_{OFR})^2} \right) \qquad (3)$$

$$A_{Inv}^Q = C_{Inv}^Q \times \Delta t, \ B_{Inv}^Q = \frac{A_{Inv}^Q}{Q_{OFR}}, \ D_{Inv}^Q = \frac{A_{Inv}^Q}{|\Delta v_n|}$$

where $$C_{Inv}^Q$$

is the cost to DER owner for producing $Q_{OFR}$ in unit $/h. $Q_{Inv}$ is zero for all inverters. $Q_{OFR}$ is the offered reactive power from this inverter. $S_{Inv}$ is the rated apparent power of the inverter.

$$A_{Inv}^Q$$

is the cost in dollars, and $\Delta_T$ is the operation duration in hour.

$$B_{Inv}^Q$$

is the cost in unit $/var. DQ Inv is the cost in $/V, $\Delta_{vn}$ is the voltage magnitude changes at node n by solving power flow with respect to the $Q_{OFR}$.

2) Demand Curve: The demand curve is designed to reflect the need of the DSO. As the application of TEA-2 is to reduce the voltage difference across a switch, the demand curve represents the voltage magnitude of a selected node that the DSO intends to increase or decrease. When a switching device of which the voltage difference is higher than the acceptable level should be closed, the DSO prepares its demand curve to express how much voltage it is requesting to increase or decrease, so it can close the switch. In some examples, the synchronizing limit of the generator-side voltage difference may be predefined. For distribution systems and microgrids, the tolerance and settings may vary among different utilities. In this example, 2% is selected for a strict limit, however other percentages may be selected in other examples.

One of the two nodes connected via the switch is selected as the targeted point where the utility needs to increase or decrease the voltage. Because the need of the DSO is expressed in terms of the amount of voltage that must be increased or decreased at the targeted node in the system, the demand curve is a straight line as shown in FIG. 3(d). The demand curve can be used either to increase or decrease the voltage at given nodes. The horizontal lines on both positive and negative sides in the demand curve (FIG. 3(d)) represent the price-cap, which is the maximum price the DSO is willing to pay.

3) Market Resolution Process: The market-clearing process includes at least two operations. First, the intersection point of the demand and the aggregated supply curve is identified. It is shown in FIG. 3(e). The point labeled as "A" represents the intersection point. This operation is similar to the market-clearing process of TEA-1; that is, a double auction market is used. When a buyer's price and a seller's asking price match, the trade proceeds at that price. Auction markets do not involve direct negotiations between individual buyers and sellers. A second operation of the process is depicted using the points labelled A-H. In FIG. 3(e), the point "B" that indicates the price in $/V can be determined using the point "A." As a result, the $\Delta_v$ of each DER can be determined using point "B" and the supply curve of that DER. See FIG. 3(c). With the $\Delta V$ needed from each DER, the reactive power amount (marked as point "F") of the DER can be determined. See FIG. 3(b). In addition, the $/kVAR price of the DER can be determined, which is marked as point "H" in FIG. 3(a). This price may vary among DERs, as the network voltage sensitivity is considered with respect to the DER locations.

IV. Operation Examples

A. Simulation Setup

Figure 7:
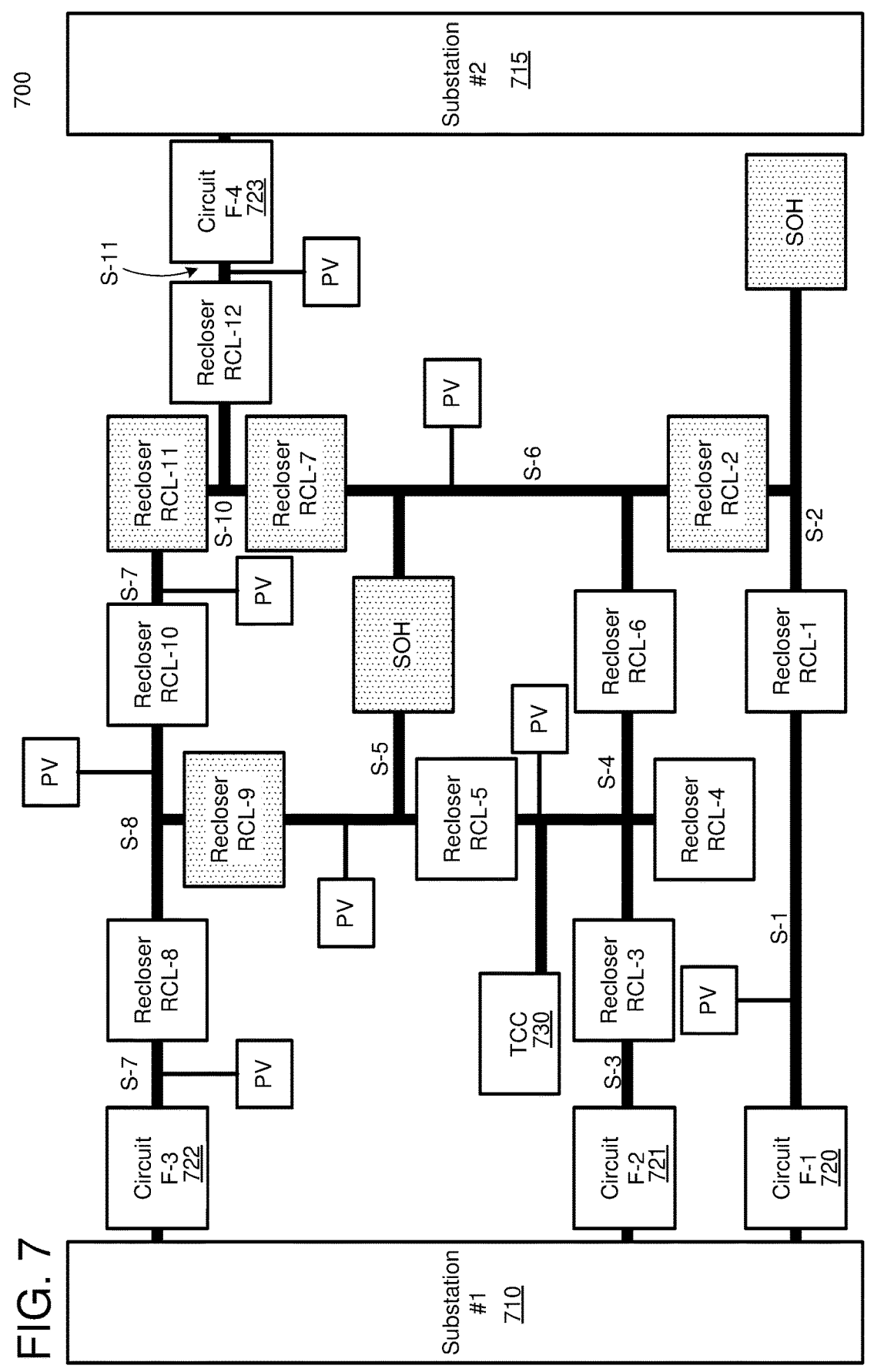
FIG. 7 depicts a test system having four operational distribution circuits, as can be used in certain examples of the disclosed technology.

The performance of an example TES mechanism can be demonstrated in a real-world utility distribution system. In this example, FIG. 7 depicts a test system 700 having four operational distribution circuits that are supplied by two substations 710 and 715. Substation #1 710 serves circuits F-1 720, F-2 721, and F-3 722, and Substation #2 715 serves circuit F-4. All four distribution circuits operate at 12.47 kV, and the utility control center has a legacy feeder automation system in operation with circuits F-3 722 and F-4 723. There is a critical load as the civic center (TCC) that is considered to be the high-priority load in the distribution circuit. TCC is typically supplied from circuit F-2 721, with the ability to manually reconfigure and supply circuits F-1 720, F-3 722, or F-4 723. Because most of the switches are manually operated, transferring TCC to a circuit other than F-2 721 can take several hours, and this operation would cause customer outages. Moreover, the manual switches are not designed to perform live closing operations. Because of these reasons, TCC is heavily dependent on the operation of circuit F-2 721 to support normal operations. Any disruptions in supply to circuit F-2 721 will cause TCC to lose power. Additionally, because the circuits primarily use manual switches, there is very little operational flexibility; during an extreme weather event, it could take well over an hour for crews to reconfigure the system. To determine the performance of the transactive energy algorithms on assisting the DSO with load transfer and reconfiguration, simulations are performed for normal and outage grid conditions. It is worth mentioning that detailed discussions of simulation results of TEA-1 and TEA-2 are presented for a scenario in which load transfers and system reconfigurations are performed as a part of restoring the system to a more resilient stage. The simulation results for outage conditions (e.g., single fault, multiple uncorrelated fault, upstream grid outage) are summarized in Table I for TEA-1. However, the simulation results for these outage conditions are not presented for TEA-2 because the voltage differentials across the reclosers were within the acceptable limits for the aforementioned outage conditions. It is worth mentioning that TEA-2 is driven by reducing the voltage difference across the recloser terminals. Therefore, the method of applying TEA-2 for outage condition is the same as the method of applying it for the presented normal operating condition.

A HELICS-based co-simulation framework may be employed to federate the distribution system simulation in GridLAB-D™, a representative DMS and transactive algorithms in Python emulator, and the communication system in ns-3. HELICS allows time synchronization between the simulators and the network reconfiguration signals to be transferred through a long-term evolution communication infrastructure modeled in ns-3 from the DMS federate to GridLAB-D that solves the distribution system dynamics.

B. Simulation Results

This section discusses an example workflow of applying the two transactive energy approaches and how they alleviate the possible problems the operators might encounter. In an example scenario of applying the TEA-1 approach, load transfers and the system reconfiguration are performed to position the system in a more resilient state, and the results are provided in tabular form (Table I) for other scenarios (e.g., single fault, multiple uncorrelated fault, or upstream grid outage). Under the normal operation conditions scenario, the systems operate with all controllers active where a slight chance of uncorrelated faults occurrence and/or scheduled maintenance activities exists. For this example, it is assumed that only the self-healing system is operational and no manual field maneuvers are performed. The system is "pre-conditioned" prior to an event to automatically reconfigure and adjust into a more resilient configuration able to overcome a possible incident, such as a major storm. The DSO is instructed to execute a series of switching operations on the system configuration described above to specifically move two segments such that the load is transferred between feeders. Reclosers RCL-1, RCL-3, RCL-4, RCL-5, RCL-6, RCL-8, RCL-10, RCL-12 are normally closed. Reclosers RCL-2, RCL-8, RCL-9, and RCL-11, shown shaded, are normally open. The example further includes switch overhead (SOH) and a number of photovoltaic energy sources (PV). In this particular example scenario, the DSO's switching plan to engage the self-healing system needs to ensure:

Segment S-9 is moved from circuit F-3 to circuit F-4
Segment S-5 is moved from circuit F-2 to circuit F-3.

The actions taken to realize this plan are:

Close RCL-11 to parallel circuits F-3 and F-4
Open RCL-10 to move segment 9 from circuit F-3 to circuit F-4
Close RCL-9 to parallel circuits F-2 and F-3
Open RCL-5 to move segment 5 from circuit F-2 to circuit F-3.

As the DSO executes the switching plan, the effects of generation taking over serving extra loads can be observed at the level of segment voltages. It is observed that once RCL-5 is switched open to complete the desired reconfiguration, the system exhibits under-voltage problems in segment S-8, according to the ANSI C84.1 Range standard for voltage tolerance. TEA-1 supports the load transfer and switch reconfiguration increasing system resiliency by engaging customer-owned DERs to provide their reactive power. Following the steps described above, the double auction market clears based on the demand curve from the DSO and the aggregated supply curves from DERs. For this example scenario, the market clears at 967 kVAR at 1.95 cents/kVAR. Subsequently, LRC calculates the additional load (619.26 kW, that is approximately 15% of the total 4, 128.43 kW), to be transferred when RCL-5 is open while ensuring voltage stays within the standard tolerance. Table I summarizes the results of the TEA-1 algorithm obtained when the microgrids operate under outage conditions (Outage-1: single fault, Outage-2: multiple simultaneous faults).

TABLE I

| Scenario | Cleared Quantity (kVAR) | Cleared Price ($) | Additional Load (kW) | Additional Load (%) | Total Load (kW) |
|---|---|---|---|---|---|
| Outage-1 | 1,934 | 0.0033 | 1,915.16 | 37 | 5,176.10 |
| Outage-2 | 15,713.75 | 0.0302 | 8,273.8 | 79 | 10,473.16 |

The results shown in Table I show that applying TEA-1 resulted in an additional load to be restored while ensuring reasonable voltage control throughout the system. These results demonstrate that the DSO can use TEA-1 as a resource to energize additional line segments and hence, restore additional loads.

TEA-2 is validated using the same normal grid operating scenario as for TEA-1. As described above, this scenario involves two switching closing operations (RCL-11 and RCL-9) that require reducing the voltage difference to enable switching. The voltage magnitude differences in three phases of RCL-11 and RCL-9 are [63.89, 134.36, 278.70] (V) and [−133.64, 146.30, −128.77] (V), respectively. With respect to the 7.2 kVLN base voltage and 2% pu limit, the upper limit can be calculated as 144 V. Therefore, both voltage magnitude differences across RCL-11 and RCL-9 are requested to be reduced for the safe switching operations.

Marginal supply curves ($/kVAR vs. kVAR) may be submitted by DERs as described above. The DSO converts these into the marginal supply curves ($ vs. V), using the voltage sensitivity at the node, to which these DERs are connected. As further described above, an aggregated supply curve for market clearing may be generated.

The DSO decides to increase the voltage magnitude of the S9-side node of RCL-11 (between S9 and S10) by 150 V (2.08% pu). With this the target ΔV (set as +150 V) and supply curve, market clearing can be performed. The settled price is 0.2442 ($/V). As a result, the voltage magnitude difference across RCL-11 is reduced to [−95.37, −1.27, 131.65] (V) ([−1.32%, −0.02%, 1.83%] pu). The 2% pu limit is satisfied, and RCL-11 is closed.

Similarly, the voltage magnitude difference across RCL 9 may be checked before the closing operation. The values before and after applying TEA-2 are [−133.64, 146.30, −128.77] (V) ([−1.86%, 2.03%, −1.79%] pu) and [−138.59, 141.16, −133.66] (V) ([−1.92%, 1.96%, −1.86%]), respectively. The DSO decides to increase the voltage magnitude of the segment S-5-side node of RCL-9 (between segments S-5 and S-8) by 5 V. The aggregated supply curve is regenerated using the power flow results under the updated topology (after closing RCL-11 and opening RCL-10). The settled price is 0.0275 ($/V). The 2% pu limit is satisfied, and RCL-9 is closed. TEA-2 resulted in closing two reclosers RCL-11 and RCL-9, which the utility was not able to close due to the larger than acceptable voltage differential across their terminals. This example demonstrates that a DSO can use TEA-2 to address local voltage constraints to support additional switching operations.

V. Example Methodology

FIG. 4 shows a flow chart 400 outlining an example method for applying the disclosed transactive mechanisms in an energy distribution system. For example, illustrated method can be performed by a controller of the energy distribution system, such as DMS 102 of FIG. 1 or another distribution system operator of a power grid, in coordination with a transactive market, such as transactive market 114 applying TEA-1, TEA-2, and/or another suitable transactive algorithm.

At process block 402, the method includes monitoring grid operations/status. For example, monitoring the grid may include receiving measurements of energy distribution throughout the grid and/or performance of devices in the grid. At process block 404, the method includes determining adjustments for stabilizing the grid operations. At process block 406, the method includes determining if the adjustments include adjusting switching devices. If the adjustments do not include adjusting switching devices (e.g., "NO" at 406), the method includes performing adjustments, as indicated at process block 408, and returns to continue monitoring the grid operations/statue.

If the adjustments include adjusting switching device (e.g., "YES" at decision block 406), the method includes determining if the targeted switching is prevented due to a voltage difference across the terminals of the switching devices, as indicated at 410. If the switching is not prevented (e.g., "NO" at decision block 410), the method includes controlling the switching devices to open or close to perform the adjustments, as indicated at process block 412, and the method returns to continue monitoring grid operations/status.

If the switching is prevented (e.g., "YES" at decision block 410), the method includes constructing and sending a demand curve based on a targeted voltage reduction to enable the switching, as indicated at process block 414. At process block 416, the method includes receiving supply curves from DERs willing to participate in a transactive operation to stabilize the grid. At process block 418, the method includes determining an effectiveness of each DER based on their respective supply curves and a location of the DERs. At process block 420, the method includes sending incentive signals to the DERs based on the determined effectiveness.

VI. Example Method of Managing a Transactive Mechanism

FIG. 5 is a flow chart 500 outlining an example method for a market operation system managing a transactive mechanism in a power grid. The illustrated method can be performed by a transactive market operation system, such as market operation system 104 of FIG. 1. At process block 502, the method includes receiving a demand curve from a distribution system operator (DSO) and/or a distribution management system (DMS, such as DMS 102 of FIG. 1). As indicated at process block 504, the demand curve may be generated based on a targeted voltage difference across a switching device (e.g., a targeted voltage difference to be reached to enable the switching device to be safely switched).

At process block 506, the method includes receiving supply curves from DERs of the power grid. For example, the demand curve may be broadcast to the DERs, and any DERs willing to participate to adjust the voltage supply on the power grid to reach the targeted voltage difference may respond with respective supply curves.

At process block 508, the method includes converting and aggregated in the supply curves. As described in more detail above, the supply curves from the DERs may be converted based on locations of the respective DERs to reflect an effectiveness of the offered supply in terms of the demand provided by the DSO. The converted curves may be aggregated to represent an overall adjustment to the power grid to reach the targeted voltage difference across the switching device. Accordingly, at process block 510, the method includes identifying the DERs that provide the most effective supply to clear the demand curve.

At process block 512, the method includes notifying the identified DERs and the DSO of the market clearance achieved based on the supply and demand curves. As indicated at process block 514, the DERs, in response, may adjust their respective voltages as propositioned in the supply curves (e.g., in accordance with an intersection point between the supply and demand curves) to regulate the voltage on the power grid and work toward the targeted voltage difference across the switching device. As indicated at process block 516, the DSO may selectively switch the switching device if the targeted voltage difference is met due to the adjustments made by the identified DERs.

VII. Additional Examples

This disclosure presents example TEAs and a transactive operational framework for engaging non-utility owned DERs during bulk-power system outages. The framework demonstrates the performance of two transactive approaches that used a market-mechanism to engage DERs during normal and grid outage conditions. The algorithms were able to engage and incentivize the participating DERs to enable additional switching operations and load restoration options. Simulation results demonstrated that the presented algorithms allowed for an increase in the number of switching operations by addressing local grid constraints, yielding to an increase in the additional load restored. Furthermore, the network voltage sensitivity can be integrated within the transactive market mechanism to take advantage of the locational benefits from spatially separated DERs.

These capabilities increase the operating flexibility of the distribution system through engagement of non-utility assets, resulting in an improved restoration of end-use loads. While these approaches are described in the context of distributed energy from PV resources, it is extensible to a range of other DERs and energy environments.

In various disclosed examples, distributed power-electronics-based devices can be used to improve both the voltage and frequency transient stability of electrical power distribution systems and networked microgrids. Selected examples can use advanced communication systems to distribute stability-oriented communications, and some examples can use machine learning technologies to identify grid transient behavior and/or perform the transactive mechanisms described herein. In some examples, additional control algorithms are leveraged upon existing power-electronics-based devices to improve the voltage transient stability of distribution systems. In particular, control methods can supplement existing control strategies and/or machine learning technology can be used to generate the described curves used in the transactive bidding mechanisms and/or train the systems for determining effectiveness of DERs based on respective supply curves and location of the DERs. In some examples, the operation of distributed power-electronics based controllers can be fully autonomous. In further examples, controllers can be controlled by advanced communication systems instead of being autonomously controlled, or can be supplemented with control commands from an advanced communication system, to further improve the dynamic performance.

In light of the above, this disclosure provides, among other features, a new transactive method that improves the distribution system resiliency by enabling additional switching operations for electric utilities. The disclosed transactive mechanism incentivizes and engages customer-owned distributed energy resources (DERs) to provide voltage supports to the distribution systems under both normal and abnormal conditions. An advantage of the technologies described herein is the integration of the network voltage sensitivity into the transactive bidding mechanism to capture the locational value of the DERs. Utilities often attempt to open and close multiple switches, reclosers, and circuit breakers (herein referenced as switching devices) during service restoration and system reconfiguration. Moreover, even during normal operations, utilities operate those switching devices to be better prepared for outage or to ensure optimal operations. However, in order to safely close switching devices, the voltage differences across their terminals should be within an acceptable limit. Those voltage differences may post restrictions on switching operations and compromise the reconfiguration and restoration operations. Therefore, this disclosure provides a transactive mechanism that engages DERs to reduce the voltage difference across those switching devices and enables the utilities to achieve more switching operations, and hence restores additional network segments. Whenever there is a need (e.g., based on grid operations/status) to close a switching device, of which the voltage difference is higher than the acceptable level, utilities can call the transactive mechanism to engage DERs. Utilities express their needs/requests in terms of the amount of voltage to be increased or decreased in a selected switching device terminal. Similarly, the DERs prepare their supply curves with price ($/kVARh) vs. reactive power quantity (VAR). However, given that the locations of DERs within the network can have higher or lower contributions to the voltage adjustment at a specific node, the transactive mechanism converts the DER supply bids into the price ($/V)—quantity (VAR) bids via the network voltage sensitivity. By converting the conventional energy price vs. quantity bids into voltage price vs. quantity bids, the transactive mechanism respects the locational value of DERs and can be effectively applied to reduce the voltage difference across terminals of switching devices.

VIII. Example Computing Environment

Figure 6:
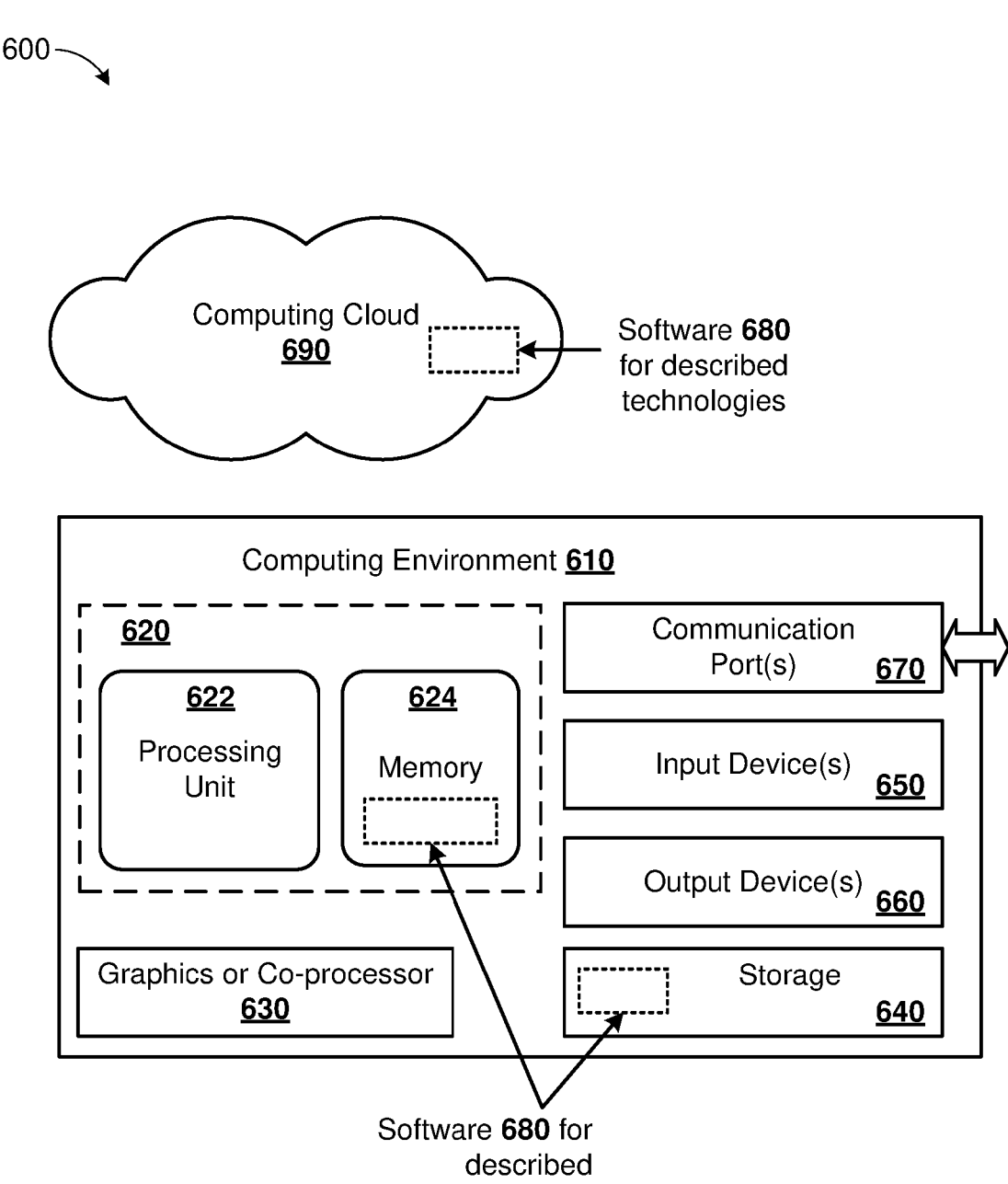
FIG. 6 is a block diagram of an example computing environment that can be used to carry out various disclosed methods.

FIG. 6 illustrates a generalized example of a suitable computing environment 600 in which described embodiments, techniques, and technologies, including determining the existence of frequency events associated with grid instabilities, regulating voltages at a grid edge, and reducing the extent of a frequency variation that occurs during the frequency events can be implemented. For example, the computing environment 600 can be used to implement any of the controllers for voltage regulation, as described herein.

The computing environment 600 is not intended to suggest any limitation as to scope of use or functionality of the technology, as the technology may be implemented in diverse general-purpose or special-purpose computing environments. For example, the disclosed technology may be implemented with other computer system configurations, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 6, the computing environment 600 includes at least one central processing unit 610 and memory 620. In FIG. 6, this most basic configuration 630 is included within a dashed line. The central processing unit 610 executes computer-executable instructions and may be a real or a virtual processor. The central processing unit 610 can be a general-purpose microprocessor, a microcontroller, or other suitable processor. In a multi-processing system, multiple processing units execute computer-executable instructions to increase processing power and as such, multiple processors can be running simultaneously. The memory 620 may be volatile memory (e.g., registers, cache, RAM), non-volatile memory (e.g., ROM, EEPROM, flash memory, etc.), or some combination of the two. The memory 620 stores software 680, parameters, and other data that can, for example, implement the technologies described herein. A computing environment may have additional features. For example, the computing environment 600 includes storage 640, one or more input devices 650, one or more output devices 660, and one or more communication connections 670. The computing environment 600 can include and/or be coupled to a power grid and/or components of a power grid, such as the DMS operation system 102, market operation system 104, and/or network operation system 106 of FIG. 1. An interconnection mechanism (not shown) such as a bus, a controller, or a network, interconnects the components of the computing environment 600. Typically, operating system software (not shown) provides an operating environment for other software executing in the computing environment 600, and coordinates activities of the components of the computing environment 600.

The storage 640 may be removable or non-removable, and includes magnetic disks, magnetic tapes or cassettes, CD-ROMs, CD-RWs, DVDs, or any other medium which can be used to store information and that can be accessed within the computing environment 600. The storage 640 stores instructions for the software 680, which can be used to implement technologies described herein.

The input device(s) 650 may be a touch input device, such as a keyboard, keypad, mouse, touch screen display, pen, or trackball, a voice input device, a scanning device, or another device, that provides input to the computing environment 600. For audio, the input device(s) 650 may be a sound card or similar device that accepts audio input in analog or digital form, or a CD-ROM reader that provides audio samples to the computing environment 600. The input device(s) 650 can also include sensors and other suitable transducers for generating data about the power grid, for example, voltage measurements, frequency measurements, current measurements, temperature, and other suitable sensor data (e.g., the measurements sent between the network operation system 106 and the DMS operation system 102). The output device(s) 660 may be a display, printer, speaker, CD-writer, or another device that provides output from the computing environment 600. The output device(s) 660 can also include interface circuitry for sending commands and signals between the components of FIG. 1, for example, to perform the transactive mechanisms described herein (e.g., to send demand and supply curves).

The communication connection(s) 670 can enable communication over a communication medium (e.g., a connecting network) to another computing entity. The communication medium conveys information such as computer-executable instructions, compressed graphics information, video, or other data in an adjusted data signal. The communication connection(s) 670 are not limited to wired connections (e.g., megabit or gigabit Ethernet, Infiniband, Fibre Channel over electrical or fiber optic connections) but also include wireless technologies (e.g., RF connections via Bluetooth®, WiFi (IEEE 802.11a/b/n), WiMax, cellular, satellite, laser, or infrared technologies) and other suitable communication connections for providing a network connection for the disclosed controllers. Both wired and wireless connections can be implemented using a network adapter. In a virtual host environment, the communication(s) connections can be a virtualized network connection provided by the virtual host. In some examples, the communication connection(s) 670 are used to supplement, or in lieu of, the input device(s) 650 and/or output device(s) 660 in order to communicate with the voltage regulators, sensors, other controllers, or smart grid components.

Some embodiments of the disclosed methods can be performed using computer-executable instructions implementing all or a portion of the disclosed technology in a computing cloud 690. For example, immediate response functions, such as generating frequency regulation signals or voltage setpoint adjustment signals can be performed in the computing environment while calculation of parameters for programming the controller (such as machine learning calculations) can be performed on servers located in the computing cloud 690.

Computer-readable media are any available media that can be accessed within a computing environment 600. By way of example, and not limitation, with the computing environment 600, computer-readable media include memory 620 and/or storage 640. As should be readily understood, the term computer-readable storage media includes the media for data storage such as memory 620 and storage 640, and not transmission media such as adjusted data signals.

IX. General Considerations

This disclosure is set forth in the context of representative embodiments that are not intended to be limiting in any way.

As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "produce," "generate," "display," "receive," "evaluate," "determine," "adjust," "deploy," and "perform" to describe the disclosed methods. These terms are high-level descriptions of the actual operations that are performed. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions stored on one or more computer-readable media (e.g., non-transitory computer-readable storage media, such as one or more optical media discs, volatile memory components (such as DRAM or SRAM), or nonvolatile memory components (such as hard drives and solid state drives (SSDs))) and executed on a computer (e.g., any commercially available computer, including microcontrollers or servers that include computing hardware). Any of the computer-executable instructions for implementing the disclosed techniques, as well as any data created and used during implementation of the disclosed embodiments, can be stored on one or more computer-readable media (e.g., non-transitory computer-readable storage media). The computer-executable instructions can be part of, for example, a dedicated software application, or a software application that is accessed or downloaded via a web browser or other software application (such as a remote computing application). Such software can be executed, for example, on a single local computer (e.g., as a process executing on any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods can also be implemented by specialized computing hardware that is configured to perform any of the disclosed methods. For example, the disclosed methods can be implemented by an integrated circuit (e.g., an application specific integrated circuit ("ASIC") or programmable logic device ("PLD"), such as a field programmable gate array ("FPGA")), programmable logic controller ("PLC"), complex programmable logic device ("CPLD"), etc. The integrated circuit or specialized computing hardware can be embedded in or directly coupled to electrical voltage regulators situated at a grid edge. For example, the integrated circuit can be embedded in or otherwise coupled to a voltage regulator (e.g., a series compensator, shunt compensator, dynamic voltage restorer, etc.). As will be readily understood to one of ordinary skill in the relevant art having the benefit of the present disclosure, a single controller can be used to control one, two, or more voltage regulators. Similarly, multiple voltage regulators each having their own associated controller can be deployed in a single system.

In view of the many possible embodiments to which the principles of the disclosed invention may be applied, it should be recognized that the illustrated embodiments are only preferred examples and should not be taken as limiting the scope of the invention. Rather, the scope of the claimed subject matter is defined by the following claims. We therefore claim as our invention all that comes within the scope of these claims.

We claim:

1. A computer-implemented method, comprising:

performing a transactive mechanism with one or more distributed energy resources (DERs) for a power grid, wherein the transactive mechanism includes determining an effectiveness of offered supply from the one or more DERs for contributing to an achievement of a targeted voltage difference across terminals of a switching device of the power grid and identifying DERs of the one or more DERs having a highest effectiveness, wherein determining the effectiveness comprises converting the offered supply from first bids expressed in a form of energy price versus reactive power quantity to second bids expressed in a form of voltage price versus reactive power quantity, the voltage price versus reactive power quantity indicating network voltage sensitivity of a respective at least one of the DERs, and wherein the transactive mechanism is configured to, based on the second bids, determining a voltage adjustment for a subset of the DERs and based on the voltage adjustment, notify the identified DERs to cause the identified DERs to adjust a corresponding supply of voltage to the power grid in order to reach the targeted voltage difference; and in response to determining that the targeted voltage difference across the terminals of the switching device is reached, switching the switching device to stabilize the power grid.

2. The method of claim 1, wherein the transactive mechanism comprises generating, at the one or more DERs, respective supply curves reflecting a cost of providing reactive power to a supplier of the power grid, and wherein the first bids comprise the respective supply curves.

3. The method of claim 2, wherein the transactive mechanism further comprises generating, at a distribution management system (DMS), a demand curve based on the targeted voltage difference and the supply curves of the DERs.

4. The method of claim 3, wherein the transactive mechanism further comprises aggregating, at a market operation system, the supply curves from the DERs and clearing the demand curve based on an intersection between the aggregated supply curves and the demand curve.

5. The method of claim 4, wherein determining the effectiveness of the offered supply includes determining an effectiveness of each of the respective supply curves for contributing to the achievement of the targeted voltage difference based on respective locations of the DERs.

6. The method of claim 5, wherein the transactive mechanism further comprises informing the identified DERs of a requested change in voltage to be supplied, wherein the requested change in voltage is based on the intersection between the aggregated supply curves and the demand curve.

7. The method of claim 5, wherein the energy price comprises price per unit of reactive power.

8. The method of claim 4, wherein the transactive mechanism utilizes a double auction market to clear the demand curve.

9. The method of claim 1, wherein the DERs include third-party DERS, the method further comprising, prior to performing the transactive mechanism, controlling utility-owned DERs that are directly controlled by a distribution management system of the power grid to adjust a voltage supplied to the power grid based on the targeted voltage difference.

10. A distribution management system (DMS) for a power grid, comprising:
   memory for storing executable instructions; and
   one or more processors that execute the instructions to:
      monitor the power grid;
      determine a switching operation for a switching device in the power grid to increase a stability of the power grid;
      determine an adjustment to a voltage difference across terminals of the switching device to enable performance of the switching operation;
      output, to a market computing system, a demand curve based on the adjustment to the voltage;
      receive, via the market system, an indication of market-cleared supply curves from one or more distributed energy resources (DERs) of the power grid identified as having a highest effectiveness of offered supply for contributing to an achievement of the adjustment to the voltage based at least in part on respective locations of the one or more DERs, wherein the market-cleared supply curves are converted from first bids expressed in a form of energy price versus reactive power quantity to second bids incorporating voltage sensitivity expressed in a form of voltage price versus reactive power quantity to reflect an effectiveness of a corresponding offered supply in terms of the demand curve;
      based on the second bids, determining a respective voltage adjustment for a subset of the DERs;
      determine that respective voltage supplies from the one or more DERs provide the respective voltage adjustment to the voltage difference across the terminals of the switching device; and
      perform the switching operation on the switching device.

11. The DMS of claim 10, wherein the switching operation is performed responsive to determining that the respective voltage supplies provide the adjustment to the voltage difference, and wherein the instructions are further executed to output an updated demand curve to the market computing system to perform another transactive mechanism responsive to determining that the respective voltage supplies from the one or more DERs cause a resulting voltage difference across the terminals of the switching device that is outside a targeted voltage range for performing the switching operation.

12. The DMS of claim 10, wherein:
   the one or more DERs include third-party DERs; and
   the instructions are further executable to control additional, utility-owned DERs directly to adjust a voltage supplied to the power grid based on the determined adjustment.

13. The DMS of claim 12, wherein the demand curve is based on a remaining adjustment to the voltage difference to enable performance of the switching operation after the voltage supplied to the power grid by the utility-owned DERs is adjusted.

14. The DMS of claim 10, further comprising a module for implementing transactive energy algorithm TEA 1, the module being used to perform at least one of: determining the switching operation, determining the voltage difference adjustment, or producing the demand curve.

15. The DMS of claim 10, further comprising a module for implementing transactive energy algorithm TEA 2, the module being used to perform at least one of: determining the switching operation, determining the voltage difference adjustment, or producing the demand curve.

16. A computer-implemented method, comprising:
   receiving a demand curve, wherein the demand curve is based on a targeted voltage adjustment for a voltage difference across terminals of a switching device of a power grid determined by a distribution management system (DMS) to enable performance of a switching operation on the switching device for stabilizing the power grid;
   receiving supply curves from one or more distributed energy resources (DERs) for supplying voltage to the power grid, the supply curves comprising first bids expressed in a form of energy price versus reactive power quantity;
   determining an effectiveness of each of the one or more DERs to clear the demand curve based on the respective supply curves and a respective location of the one or more DERs, wherein determining the effectiveness comprises converting the supply curves to second bids expressed in a form of voltage price versus reactive power quantity, the voltage price versus reactive power quantity indicating network voltage sensitivity for respective the one or more DERs;
   based on the second bids, determining a voltage adjustment for a subset of the DERs; and
   transmitting incentive signals indicating the voltage adjustment to the subset of the one or more DERs based on the determined effectiveness, the transmitted incentive signal causing at least one of the subset of DERs to adjust a respective voltage supplied to the power grid to reach the targeted voltage adjustment across the terminals of the switching device, wherein the switching operation is performed responsive to reaching the targeted voltage adjustment across the terminals of the switching device.

17. The computer-implemented method of claim 16, wherein the supply curves reflect a cost of providing, with the respective DERs, reactive power to a supplier of the power grid.

18. The computer-implemented method of claim 16, further comprising aggregating the supply curves and determining an intersection between the demand curve and the aggregated supply curves.

19. The computer-implemented method of claim 18, wherein the incentive signals include an indication of the intersection between the demand curve and the aggregated supply curves.

20. The computer-implemented method of claim 18, further comprising notifying the DMS of the aggregated supply curves.

21. A non-transitory computer-readable storage medium storing computer-readable instructions, which when executed by a computer, cause the computer to perform a method, the instructions comprising:

instructions that cause the computer to receive a demand curve, wherein the demand curve is based on a targeted voltage adjustment for a voltage difference across terminals of a switching device of a power grid determined by a distribution management system (DMS) to enable performance of a switching operation on the switching device for stabilizing the power grid;

instructions that cause the computer to receive supply curves from one or more distributed energy resources (DERs) for supplying voltage to the power grid, the supply curves comprising first bids expressed in a form of energy price versus reactive power quantity;

instructions that cause the computer to determine an effectiveness of each of the one or more DERs to clear the demand curve based on the respective supply curves and a respective location of the one or more, wherein determining the effectiveness comprises converting the supply curves to second bids expressed in a form of voltage price versus reactive power quantity, the voltage price versus reactive power quantity indicating network voltage sensitivity for respective the one or more DERs;

instructions that cause the computer to based on the second bids, determine a voltage adjustment for a subset of the DERs; and instructions that cause the computer to transmit incentive signals indicating the voltage adjustment to the subset of the one or more DERs based on the determined effectiveness, the transmitted incentive signal causing at least one of the subset of DERs to adjust a respective voltage supplied to the power grid to reach the targeted voltage adjustment across the terminals of the switching device, wherein the switching operation is performed responsive to reaching the targeted voltage adjustment across the terminals of the switching device.

22. The non-transitory computer-readable storage medium of claim 21, wherein the instructions further comprise instructions to aggregate the supply curves and determining an intersection between the demand curve and the aggregated supply curves.

23. The non-transitory computer-readable storage medium of claim 22, wherein the instructions further comprise instructions to notify the DMS of the aggregated supply curves.

* * * * *